(12) United States Patent
Zheng et al.

(10) Patent No.: US 12,383,882 B2
(45) Date of Patent: *Aug. 12, 2025

(54) REACTOR ASSEMBLIES AND METHODS OF PERFORMING REACTIONS

(71) Applicant: Battelle Memorial Institute, Richland, WA (US)

(72) Inventors: Richard F. Zheng, Lake Oswego, OR (US); Robert S. Wegeng, Richland, WA (US); Paul H. Humble, Kennewick, WA (US); Dustin D. Caldwell, Portland, CT (US); Richard B. Diver, Albuquerque, NM (US); Ward E. TeGrotenhuis, Kennewick, WA (US); Christopher K. Clayton, Kennewick, WA (US); Timothy G. Veldman, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 198 days.

This patent is subject to a terminal disclaimer.

(21) Appl. No.: 18/179,358

(22) Filed: Mar. 6, 2023

(65) Prior Publication Data

US 2023/0226513 A1    Jul. 20, 2023

Related U.S. Application Data

(60) Continuation-in-part of application No. 17/834,673, filed on Jun. 7, 2022, now Pat. No. 12,017,196, and
(Continued)

(51) Int. Cl.
*B01J 19/00* (2006.01)
*C01B 3/16* (2006.01)
(Continued)

(52) U.S. Cl.
CPC ....... *B01J 19/0093* (2013.01); *B01J 19/0013* (2013.01); *C01B 3/16* (2013.01);
(Continued)

(58) Field of Classification Search
None
See application file for complete search history.

(56) References Cited

U.S. PATENT DOCUMENTS

| 4,668,494 A | 5/1987 | Van Hook |
| 6,533,840 B2 | 3/2003 | Martin et al. |

(Continued)

FOREIGN PATENT DOCUMENTS

JP        2008-157592 A        7/2008

OTHER PUBLICATIONS

Third Office Action in Chinese Application No. CN202080030707. 0A dated Mar. 28, 2024.
(Continued)

*Primary Examiner* — Mohammad M Ameen
(74) *Attorney, Agent, or Firm* — Derek H. Maughan; Frank Rosenberg

(57) ABSTRACT

Reactors are provided that can include a first set of fluid channels and a second set of fluid channels oriented in thermal contact with the first set of fluid channels. The reactor assemblies can also provide where the channels of either one or both of the first of the set of fluid channels are non-linear. Other implementations provide for at least one of the first set of fluid channels being in thermal contact with a plurality of other channels of the second set of fluid channels. Reactor assemblies are also provided that can include a first set of fluid channels defining at least one non-linear channel having a positive function, and a second set of fluid channels defining at least another non-linear channel having a negative function in relation to the positive
(Continued)

function of the one non-linear channel of the first set of fluid channels. Processes for distributing energy across a reactor are provided. The processes can include transporting reactants via a first set of fluid channels to a second set of fluid channels, and thermally engaging at least one of the first set of fluid channels with at least two of the second set of fluid channels.

19 Claims, 17 Drawing Sheets

Related U.S. Application Data a continuation-in-part of application No. 17/222,947, filed on Apr. 5, 2021, now Pat. No. 11,596,920, which is a division of application No. 16/449,281, filed on Jun. 21, 2019, now Pat. No. 10,981,141, said application No. 17/834,673 is a division of application No. 16/359,909, filed on Mar. 20, 2019, now Pat. No. 11,358,111.

(60) Provisional application No. 62/688,217, filed on Jun. 21, 2018.

(51) Int. Cl.
   C01B 3/38      (2006.01)
   F24S 20/20     (2018.01)
   F24S 90/00     (2018.01)

(52) U.S. Cl.
   CPC ............... C01B 3/38 (2013.01); F24S 20/20 (2018.05); F24S 90/00 (2018.05); B01J 2219/00081 (2013.01); B01J 2219/00788 (2013.01); B01J 2219/00804 (2013.01); B01J 2219/00873 (2013.01); B01J 2219/00995 (2013.01); C01B 2203/0233 (2013.01); C01B 2203/0283 (2013.01); C01B 2203/063 (2013.01); C01B 2203/066 (2013.01); C01B 2203/0833 (2013.01); C01B 2203/1241 (2013.01)

(56) References Cited

U.S. PATENT DOCUMENTS

| | | | |
|---|---|---|---|
| 6,746,515 | B2 | 6/2004 | Wegeng et al. |
| 6,872,378 | B2 | 3/2005 | Weimer et al. |
| 6,974,496 | B2 | 12/2005 | Wegeng et al. |
| 6,984,363 | B2 | 1/2006 | Tonkovich et al. |
| 7,045,114 | B2 | 5/2006 | Tonkovich et al. |
| 7,186,388 | B2 | 3/2007 | Bowe |
| 7,270,905 | B2 | 9/2007 | Wegeng et al. |
| 7,288,231 | B2 | 10/2007 | Tonkovich et al. |
| 7,297,324 | B2 | 11/2007 | TeGrotenhuis et al. |
| 7,488,454 | B2 | 2/2009 | Katayama et al. |
| 7,501,101 | B2 | 3/2009 | Wegeng et al. |
| 7,520,917 | B2 | 4/2009 | TeGrotenhuis et al. |
| 7,632,320 | B2 | 12/2009 | Tonkovich et al. |
| 7,651,669 | B2 | 1/2010 | Wegeng et al. |
| 7,926,793 | B2 | 4/2011 | Stenkamp et al. |
| 8,464,927 | B2 | 6/2013 | Pinchot |
| 8,771,387 | B2 | 7/2014 | Simmons et al. |
| 8,772,360 | B2 | 7/2014 | Allam |
| 8,893,505 | B2 | 11/2014 | Mokheimer et al. |
| 9,011,560 | B2 | 4/2015 | Simmons et al. |
| 9,079,153 | B2 | 7/2015 | Tsujii et al. |
| 9,266,732 | B2 | 2/2016 | Park et al. |
| 9,452,932 | B2 | 9/2016 | Park et al. |
| 10,598,068 | B2 | 3/2020 | Masoudi |
| 11,077,418 | B2 | 8/2021 | Wegeng et al. |
| 11,358,111 | B2* | 6/2022 | Zheng ..................... C01B 3/38 |
| 11,623,199 | B2 | 4/2023 | Wegeng et al. |
| 2004/0141893 | A1 | 7/2004 | Martin |
| 2004/0258587 | A1* | 12/2004 | Bowe .................... B01J 19/249 422/601 |
| 2006/0029541 | A1 | 2/2006 | Tonkovich et al. |
| 2006/0045842 | A1 | 3/2006 | Wegeng et al. |
| 2008/0173533 | A1 | 7/2008 | Mankins et al. |
| 2008/0175766 | A1 | 7/2008 | Mankins et al. |
| 2008/0283109 | A1 | 11/2008 | Mankins et al. |
| 2008/0295403 | A1 | 12/2008 | Woods et al. |
| 2010/0098599 | A1 | 4/2010 | Mankins et al. |
| 2013/0330246 | A1 | 12/2013 | Stemmet |
| 2015/0137412 | A1 | 5/2015 | Schalansky |

OTHER PUBLICATIONS

Translation of Third Office Action in Chinese Application No. CN202080030707.0A dated Mar. 28, 2024.
First Office Action in Japanese Application No. JP2021556905A dated May 15, 2024.
Translation of First Office Action in Japanese Application No. JP2021556905A dated May 15, 2024.
Translation of JP 2008-157592 A.
Angelino et al. "binary conversion cycles for concentrating solar power technology", Solar Energy vol. 82, Issue 7, Jul. 2008, pp. 637-647.
Bohmer, M. et al., "Solar steam reforming of methane", Solar Energy Materials vol. 24, Issues 1-4, Dec. 2, 1991, pp. 441-448.
Buck, R. et al., "Carbon dioxide reforming of methane in a solar volumetric receiver/reactor" The CAESAR Project, Solar Energy Materials, 24 (1991) 449-463.
Cao, C. et al., "Heterogeneous reactor model for steam reforming of methane in a microchannel reactor with microstructured catalysts", Catalysts Today, 110, 2005, 92-97.
Dharaiya, V. V., C. et al., "Evaluation of a Tapered Header Configuration to Reduce Flow Maldistribution in Minichannels and Microchannels", ASME 2009 7th International Conference on Nanochannels, Microchannels, and Minichannels.
Du Marchie Van Voorthuysen, Evert. H., "The promising perspective of concentrating solar power (CSP)", 2005 International Conference on Future Power Systems.
Hogan, Jr., R. E. et al., "A direct absorber reactor/receiver for soalr thermal applications", Chemical Engineering Science vol. 45, Issue 8, 1990, pp. 2751-2758.
Hong, H. et al., "Solar thermal power cycle with integration of methanol decomposition and middle-temperature solar thermal energy", Solar Energy, 78(1), 2005, 49-58.
Lovegrove, K. et al., "Developing ammonia based thermochemical energy storage for dish power plants", Solar Energy, 76 (2004) 331-337.
Muir, J. F. et al., Solar reforming of methane in a direct absorption catalytic reactor on a parabolic dish: I—Test and analysis, Solar Energy, 52(6) (1994) 467-477.
Muir, J. F. et al., "The CAESAR Project: Experimental and modeling investigations of methane reforming in a catalytically enhanced solar absorption receiver on a parabolic dish".
Petrasch, J. et al., "Dynamics of a solar thermochemical reactor for steam-reforming of methane", Chemical Engineering Science, 62(16) (2007) 4214-4228.
Philippe, R. et al., "Effect of Structure thermal properties of a Fischer-Tropsch catalyst in a fixed bed", Catalysis Today vol. 147 (2009) pp. S305-S312.
Saber, M. et al., "Microreactor numbering-up in multi-scale networks for industrial-scale applications: Impact of flow maldistribution on the reactor performances", Chemical Engineering Sciences, 65, 2010, 372-379.
Schreiber, J. G. et al. "Summary of Stirling convertor testing at NASA gleen research center", NASA/TM-2006-214429, 2007.
Graggen, A. Z. et al., "Hydrogen production by steam-gasification of petroleum coke using concentrated solar power", International Journal of Hydrogen Energy vol. 31, Issue 6, (2006) pp. 797-811.
Wang, Y. et al., "Highly active and stable Rh/MgO—Al2O3 catalysts for methane steam reforming", Catalysis Today 98 (2004) 575-581.

(56) References Cited

OTHER PUBLICATIONS

Wegeng, R. S. et al., "Solar Thermochemical Production of Fuels", 5th International Energy Conversion Engineering Conference and Exhibit (IECEC), Jun. 25-27, 2007, St. Louis, Missouri.
Yue, J., et al. "Flow distribution and mass transfer in a parallel microchannel contactor integrated with constructal distributors", AIChE Journal, vol. 56, No. 2 (2010) pp. 298-317 doi:10.1002/aic. 11991.
International Preliminary Report on Patentability from International Application No. PCT/US2020/023832 dated Sep. 16, 2021.
International Search Report from International Application No. PCT/US2020/023832 date of mailing Aug. 11, 2020.
Written Opinion of the International Search Authority from International Application No. PCT/US2020/023832 date of mailing Aug. 11, 2020.
Extended European Search Report and Search Opinion in European Application No. EP20773025.0A Mailed Dec. 12, 2022.
First Office Action in Chinese Application No. CN202080030707. 0A date of mailing Jan. 5, 2023.
Translation of First Office Action in Chinese Application No. CN202080030707.0A date of mailing Jan. 5, 2023.
Second Office Action in Chinese Application No. CN202080030707. 0A date of mailing Dec. 27, 2023.
Translation of Second Office Action in Chinese Application No. CN202080030707.0A date of mailing Dec. 27, 2023.
Fourth Office Action in Chinese Patent Application No. CN202080030707.0A dated Aug. 9, 2024.
Translation of Fourth Office Action in Chinese Patent Application No. CN202080030707.0A dated Aug. 9, 2024.
First Office Action in Mexican Application No. MX/a/2021/011265 dated Feb. 19, 2025.
Translation of First Office Action in Mexican Application No. MX/a/2021/011265 dated Feb. 19, 2025.
Second Office Action in Japanese Application No. JP2021556905A date of mailing Feb. 21, 2025.
Machine Translation of Second Office Action in Japanese Application No. JP2021556905A date of mailing Feb. 21, 2025.
First Office Action in Indian Application No. 202137046035 date of mailing Feb. 27, 2025.
First Office Action in Australian Patent Application No. AU2020240119A dated Apr. 7, 2025.

\* cited by examiner

REACTOR ASSEMBLIES AND METHODS OF PERFORMING REACTIONS

RELATED PATENT DATA

This application is a continuation-in-part of U.S. patent application Ser. No. 17/834,673 filed Jun. 7, 2022, which is a divisional of U.S. patent application Ser. No. 16/359,909, now U.S. Pat. No. 11,358,111, filed Mar. 20, 2019, entitled "Reactor Assemblies and Methods of Performing Reactions", the entirety of which is incorporated by reference herein. This application also claims priority to U.S. patent application Ser. No. 17/222,947 filed Apr. 5, 2021, which is a divisional of U.S. patent application Ser. No. 16/449,281, now U.S. Pat. No. 10,981,141 filed Jun. 21, 2019, and claims priority benefit of U.S. Provisional Application No. 62/688,217 filed Jun. 21, 2018. U.S. patent application Ser. No. 17/222,947 is incorporated in its entirety by reference herein.

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

The present disclosure relates to reactor assemblies and methods for performing reactions. Embodiments of the disclosure related to performing endothermic reactions. Embodiments of the disclosure can also utilize solar energy or other heat sources to drive the endothermic reactions.

BACKGROUND

In the case of hydrogen production, current commercial technologies include conventional steam methane reforming in systems that combust a portion of the product stream in order to drive the endothermic reaction, and water electrolysis where the energy for the electrochemical reaction typically comes from the electrical grid. Solar thermochemical production of hydrogen from natural gas or other sources of methane can have the advantage of greater overall energy efficiency and reduced carbon emissions compared to conventional steam-methane reforming and water electrolysis using grid electricity.

Reactor systems have been designed for steam reforming of methane and other hydrocarbons using concentrated solar power. Reactor assemblies and methods have been provided that include U.S. Pat. No. 9,950,305 issued Apr. 24, 2018, entitled "Solar Thermochemical Processing System and Method", and U.S. patent application Ser. No. 15/950,068 filed Apr. 10, 2018, entitled "Solar Thermochemical Processing System and Method", the entirety of each of which is incorporated by reference herein.

SUMMARY OF THE DISCLOSURE

Reactors are provided that can include a first set of fluid channels and a second set of fluid channels oriented in thermal contact with the first set of fluid channels. The channels of either one or both sets of fluid channels can be non-linear.

Stacked reactor assemblies are also provided that can include first and second sets of fluid channels in a stacked configuration with the fluid channels oriented in thermal contact with each other, and at least one of the first set of fluid channels being in thermal contact with a plurality of other channels of the second set of fluid channels.

Reactor assemblies are also provided that can include a first set of fluid channels defining at least one non-linear channel having a shape defined by a positive mathematical function, and a second set of fluid channels defining at least another non-linear channel having a shape defined by a negative mathematical function in relation to the positive mathematical function of the one non-linear channel of the first set of fluid channels.

Processes for distributing energy across a reactor are provided. The processes can include transporting reactants via a first set of fluid channels to a second set of fluid channels, and thermally engaging at least one of the first set of fluid channels with at least two of the second set of fluid channels.

Embodiments of the present disclosure can utilize thermal energy to facilitate or drive an endothermic reaction in at least one of the sets of fluid channels. In particular embodiments, heat for the channels can be provided from a variety of sources, including electrical heating, exothermic chemical processes, and/or solar energy. Reactors and/or methods can provide a high temperature endothermic reaction such as methane steam reforming or reverse-water gas shift where the heat of reaction is largely provided by solar energy. The reactors and/or methods of the present disclosure have applications in syngas generation, which can be a precursor for the production of many chemicals, including hydrogen which can be useful in refineries, for fuel cells including fuel cell vehicles, and in other chemical processing applications.

Reactor assemblies and/or methods of the present disclosure can have two sets of spiral shaped fluid channels that can be separated by a thin member and arranged in opposite spiral directions to form a cross flow pattern, a counterflow pattern, or a counter-cross-flow pattern. Each set can be an array of repeating non-linear units that define one or multiple channels of spiral flow paths. The axes of symmetry of the two channel groups can coincide at a hub. While the repeating units for each fluid channel can be the same or different, according to example embodiments the repeat units can be different. The non-linear fluid channels forming the repeat unit of the array can be derived from a general curve of a spiral nature, the curve being either planar or 3-dimensional. While many types of spiral curves can be used, Archimedean and logarithmic spirals and their 3-dimensional derivatives are particularly relevant.

The integration of non-linear fluid channels and/or non-linear counter-flow or non-linear counter-cross-flow channels can provide two benefits which translate to performance and economic advantages. First, the combination can provide thermal spreading which, as described below, reduces the severity of hot spots and thermal stress, warms cold spots, and improves reactor lifetime. Second, the combination can allow for the recuperation of thermal energy (sensible heat) from the product stream to provide additional heat for the reaction. This may lower the amount of solar energy required for a given amount of reaction and therefore makes the reactor system more efficient, more productive and less costly.

DRAWINGS

Embodiments of the disclosure are described below with reference to the following accompanying drawings.

DESCRIPTION

It has been recognized that for practical solar concentrators, there can be hot spots at the reactor surface due to imperfections in the solar concentrator optics. The hot spots, or local points of high solar flux, can limit the maximum total operating flux because of reactor metallurgy limits. Hot spots, or other thermal gradients, can also induce large thermal stresses in the reactor which can lead to reduced life time over thermal cycles due to low cycle fatigue. Thus, the differential temperatures associated with thermal gradients can lead to high operating and/or capital costs and failures, causing reduced lifetimes, for the reactor system.

Figure 1:
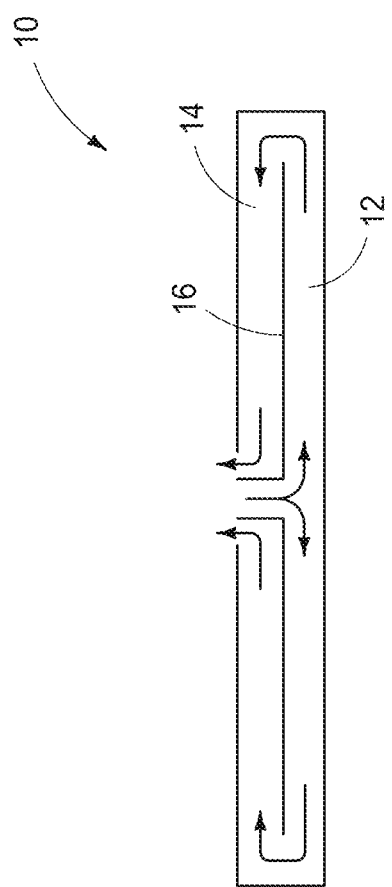
FIG. 1 is a cross sectional view of a reactor assembly according to an embodiment of the disclosure.

The present disclosure will be described with reference to FIGS. 1-13. Referring first to FIG. 1, a reactor 10 is shown in accordance with one cross section that includes a first set of fluid channels 12 in a stacked configuration above a second set of fluid channels 14. These fluid channels can be in thermal contact with one another via member 16. In accordance with example implementations, one or both of the sets of these channels can include fluid channels that are non-linear. In accordance with other implementations, one of the channels of the first set of fluid channels can be in thermal contact with a plurality of other channels of the second set of fluid channels. As shown in FIG. 1, reactor 10 can include a flow of reactants to the first set of fluid channels that traverse across a length of member 16 and then through a fluid passageway to the second set of fluid channels 14, and then exit the reactor after traversing member 16.

Figure 2:
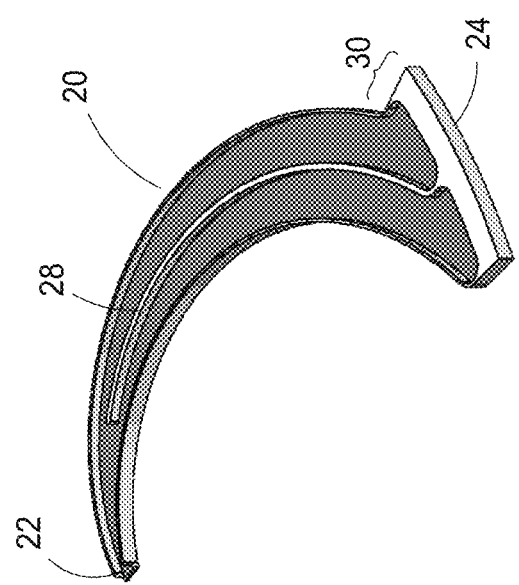
FIG. 2 is a view of a set of channels of a reactor assembly according to an embodiment of the disclosure.

Referring next to FIG. 2, one example of non-linear channels 20 are shown. Non-linear channels 20 can emanate from hub 22 to rim 24 of a reactor and non-linear channels 20 may have a dividing member 28 therein. Non-linear channels 20 in combination with dividing member 28 can form a pair of fluid passageways 30, for example. The channels can be microchannels or mesochannels. A microchannel may be of any length in the general direction of bulk flow and has one dimension, e.g., the width, that is typically in the direction of heat and/or mass transport and is greater than or equal to 1 micron and less than or equal to 1 millimeter. A mesochannel may be of any length in the general direction of bulk flow and has one dimension, e.g., the width, that is typically in the direction of heat and/or mass transport and is greater than 1 millimeter and less than or equal to 1 centimeter.

Figure 3:
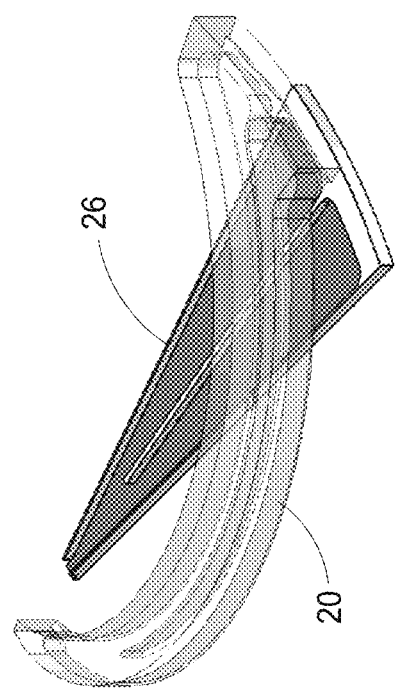
FIG. 3 depicts two sets of reactor channels in a stacked configuration according to an embodiment of the disclosure.

Referring next to FIG. 3, in accordance with one example embodiment of the disclosure, non-linear channels 20 of one set of fluid channels can be associated with another set of linear fluid channels 26, and these channels may be stacked upon each other in accordance with example implementations.

Figure 4:
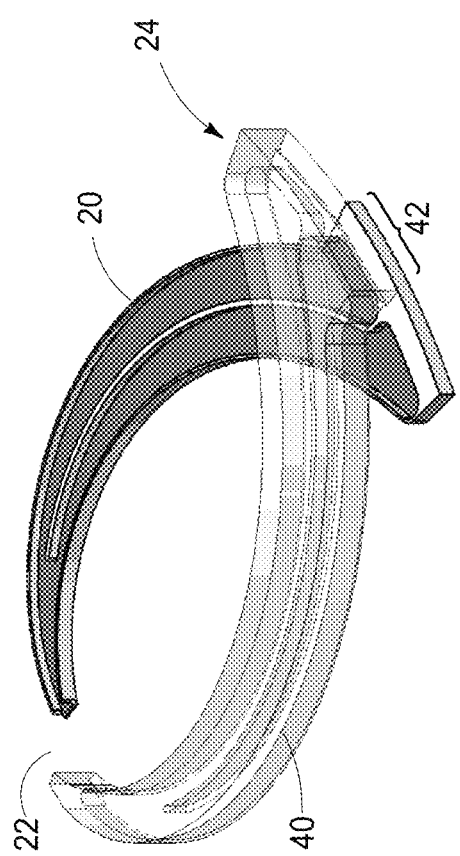
FIG. 4 depicts two sets of reactor channels in a stacked configuration according to an embodiment of the disclosure.

Referring next to FIG. 4, a pair of non-linear channels 20 and 40 are shown in accordance with one configuration, providing for fluid communication at 42 of fluid channels 20 and 40. As shown, both channels 20 and 40 are non-linear. As shown in FIGS. 5A-5D, non-linear channels 20 and 40 can be associated to form at least a portion of a reactor assembly 50 with these channels emanating from a hub 22 and extending to a rim 24 of assembly 50. Within each of these channels can be a dividing member 58. Dividing member 58 can extend toward rim 24 to form a pair of fluid conduits. In accordance with example implementations, there can be a plurality of non-linear channels 52 as well as a plurality of non-linear channels 54 that can form part of, or in the case of FIG. 5D all of, reactor 50. In accordance with example implementations, this may be considered a spiral channel design.

Figure 6:
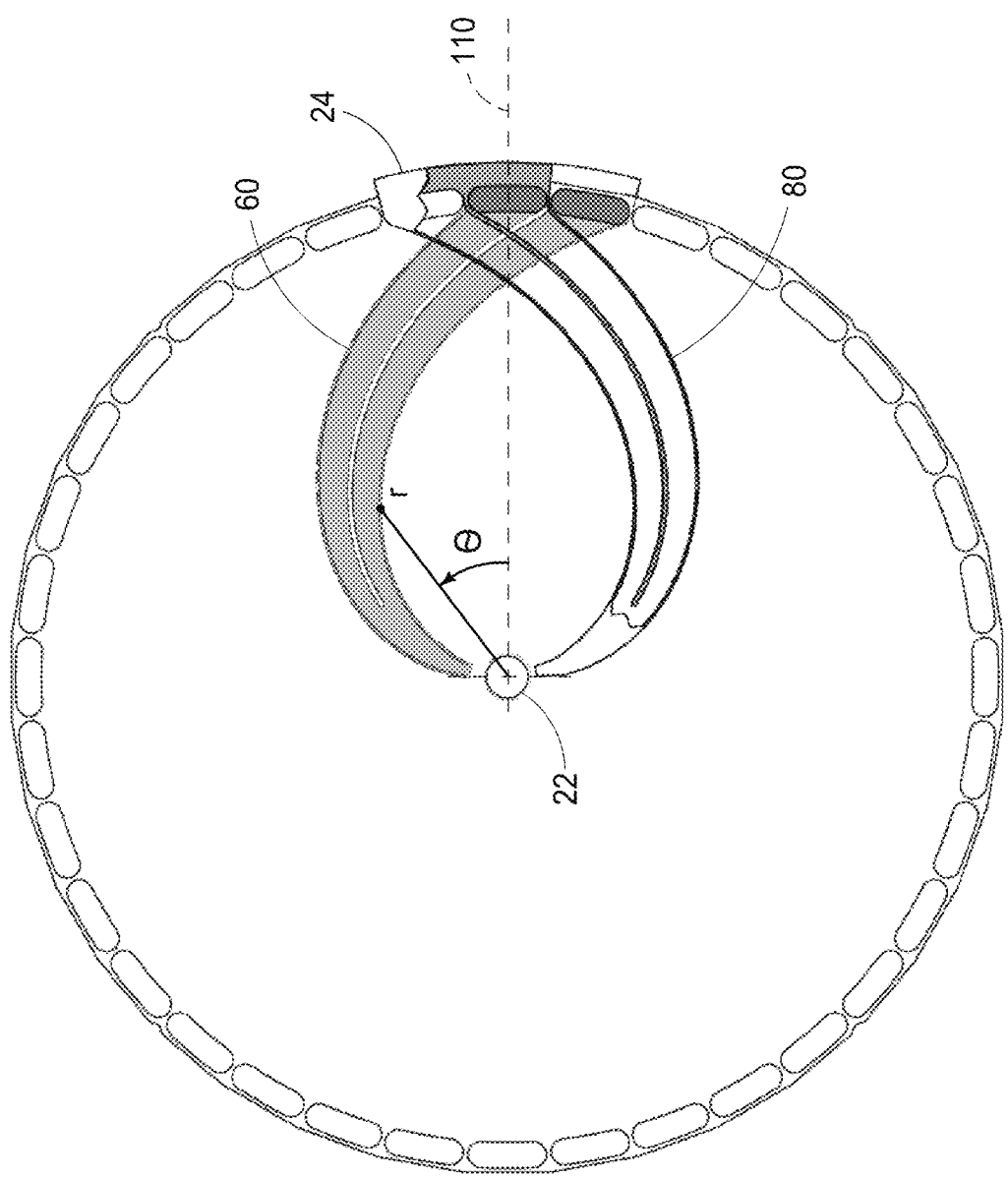
FIG. 6 is a view of a configuration and an entire reactor within the confines of (r, θ) coordinates according to an embodiment of the disclosure.

Referring next to FIG. 6, sets of non-linear channels are shown emanating from hub 22 to a rim 24 of a reactor. These channels are shown aligned along an example polar coordinate system 110 wherein the shape of non-linear channels 60 can be considered to have a positive mathematical function about the coordinate system, while the shape of non-linear channels 80 can be considered to have a negative mathematical function about the coordinate system.

The mathematical functions defining the channel shape and orientation can be expressed by the general equation θ=ƒ(r) in reference to the polar coordinate system 110 with coordinates (r, θ) in FIG. 6, where ƒ is an arbitrary function that defines specific curvatures. For example, Archimedean spiral and similar curves are given by θ=((r−b)/a)$^c$; logarithmic spiral curves are given by θ=(ln r−ln a)/b; linear lines are given by θ=d, where a, b, c, and d are parameters of arbitrary constants. For the set of nonlinear channels 60 described by a positive function θ=ƒ(r) about the polar coordinate system 110, the corresponding set of channels 80 can be described by a related negative function defined by θ=−ƒ(r). More generally, one set of nonlinear channels can be defined by a positive function θ=ƒ$_1$(r) and the other set of nonlinear channels can be defined by a negative function θ=−ƒ$_2$(r), where mathematical functions ƒ$_1$ and ƒ$_2$ may or may not be identical. Furthermore, the mathematical functions describing the shape of non-linear channels can be three-dimensional space curves in nature, in which case a general function θ=ƒ(r,z) in reference to a cylindrical coordinate system (r, θ, z) can substitute θ=ƒ(r) in the proceeding discussion without loss of generality.

In accordance with example implementations, the non-linear mathematical functions of the shape of fluid channels 60 and 80 when taken as absolute values can be equal to one another, thereby having a mirror image of one another. In accordance with other implementations, the fluid channels may not be mirror images of each other but may still be configured as counter spirals. In accordance with example implementations, reactors can include a plurality of non-linear fluid channels having the same positive function as well as a plurality of non-linear channels having the same negative function. The reactor can include an entirety of one set of non-linear channels having a positive function and another set of non-linear channels having a negative function. In accordance with example implementations, and with reference to FIG. 7A, reactor 200 is shown that includes an inlet 202 and an outlet 204. Reactor 200 can include a first set of fluid channels 212 as well as a second set of fluid channels 214 that are coupled at fluid passageways 230, for example. With the exception of passageways 230, between sets of fluid channels 214 and 212, can be a member 216. This can be a thermally conductive member that can also form the ceiling of the first set of fluid members 212 as well as the floor of the second set of fluid channels 214. In accordance with example implementations, at least a portion of channels 212 may be provided with a catalyst, for example, to facilitate reactions as desired. The catalyst can be packed into either or both sets of channels in the form of foams, felts, lattices, or particles, for example. The catalyst can also be coated to channel walls, which including part of member 216, which forms the floor of one set of channels and ceiling of the other set.

In accordance with example implementations, catalyst supported on foam can be provided into one set of channels 212. In accordance with example implementations, and with reference to individual fluid channels of one set 212, an individual fluid channel of reactor 200 can be in thermal connection with as many as two if not as many as 14 individual channels of the other set 214, as shown as a plurality of contact at 206.

Figure 7A:
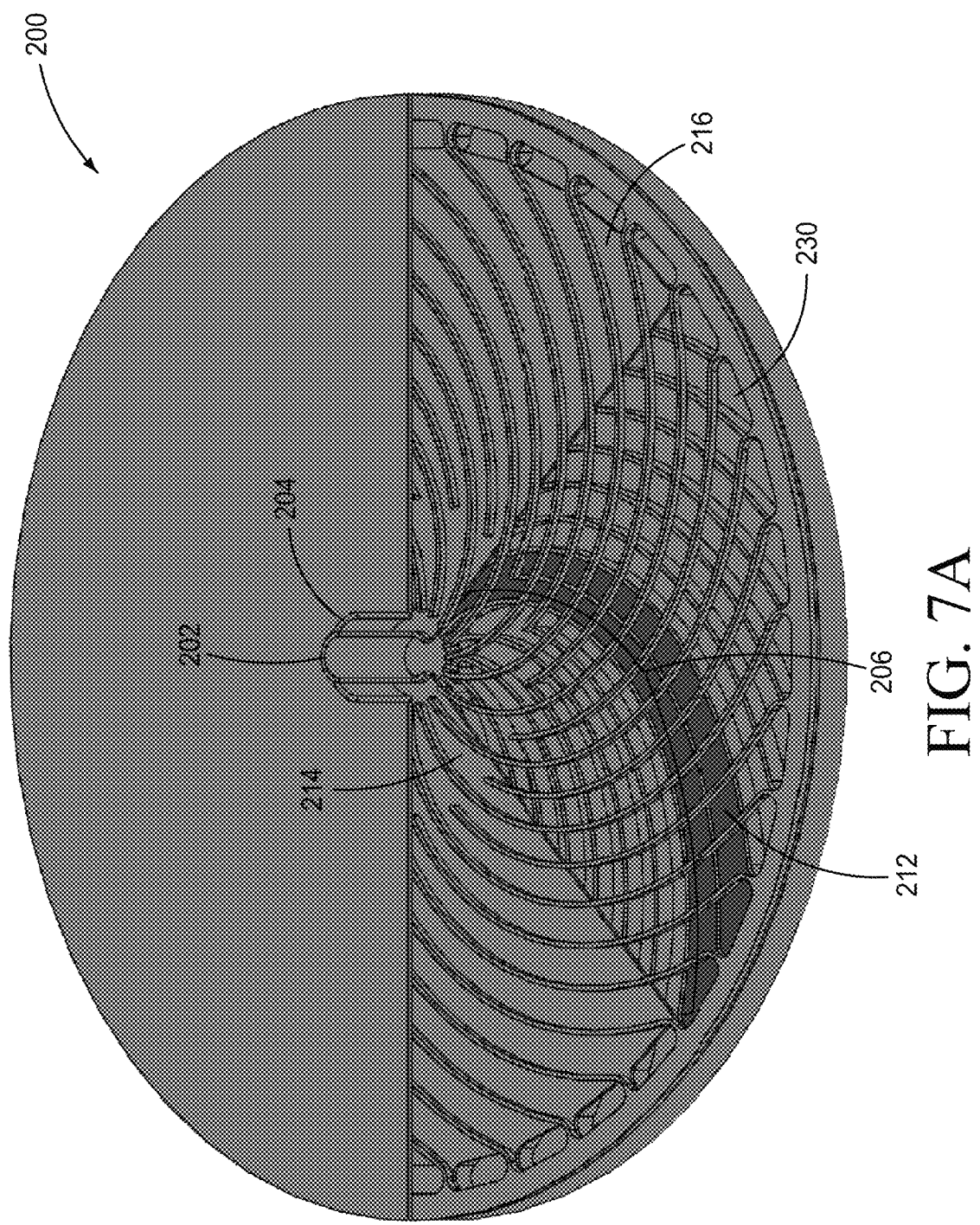
FIG. 7A is a depiction of a reactor shown with partial cut away portions according to embodiment of the disclosure.
Figure 8:
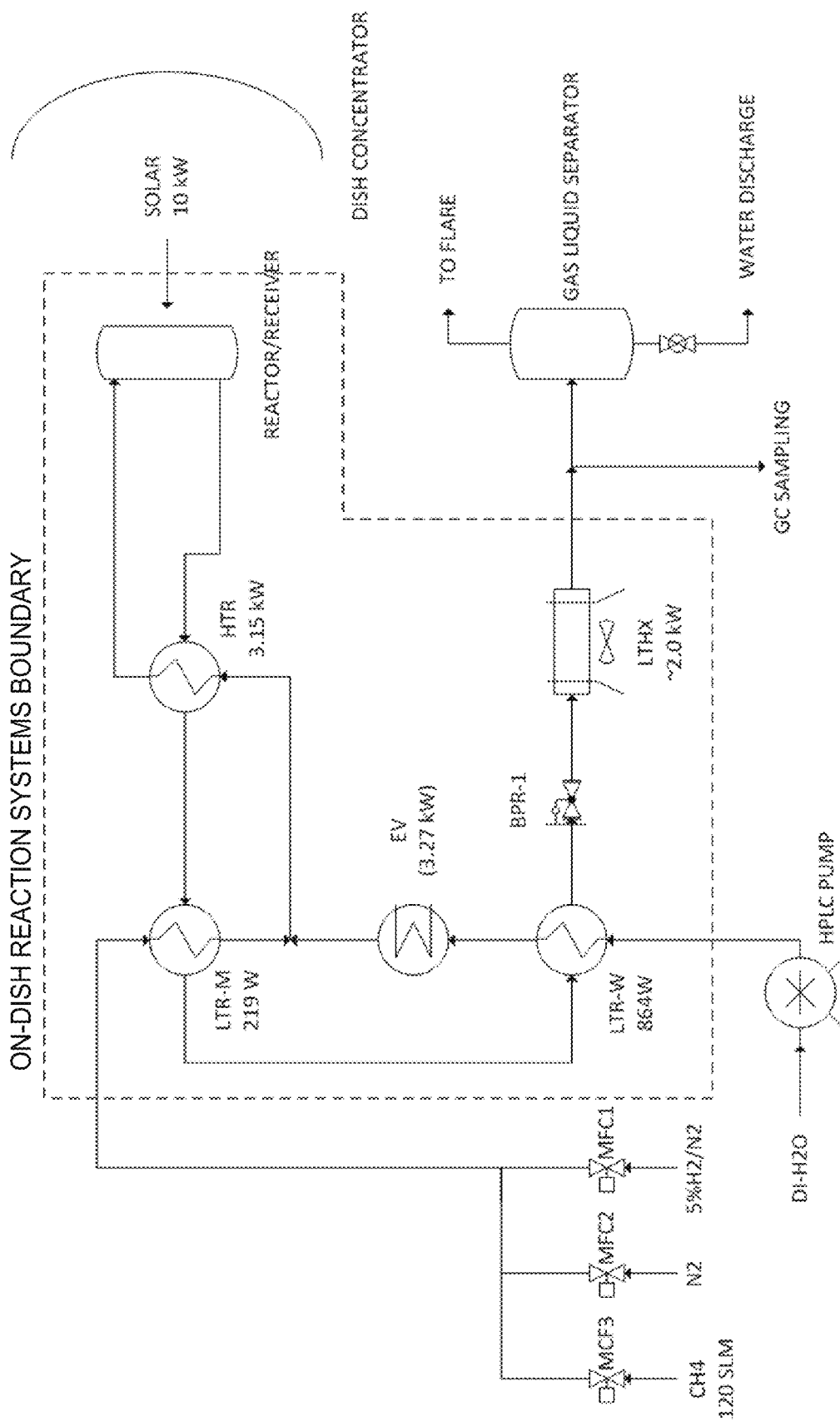
FIG. 8 is a reaction schematic according to an embodiment of the disclosure.

The process can provide transporting reactants via a first set of fluid channels and extracting products from a second set of fluid channels and thermally engaging at least one of the first set of fluid channels with at least two of the second set of fluid channels as shown, for example, in FIG. 7A. In accordance with example implementations, an endothermic reaction can be provided in one of these sets of fluid channels, for example, fluid channels 212 can have reactants provided thereto and be an endothermic reaction which can require facilitating the endothermic reaction with solar energy as shown in FIG. 8. In accordance with example implementations, the reactor of FIG. 7A has a portion not shown (under portion or face) that can be exposed to solar energy to provide energy to facilitate or drive this endothermic reaction. In accordance with other implementations, as the reaction proceeds through the reactor, and heated products return via the set of fluid channels 214, the heat of these products is transmitted via member 216 to the endothermic reaction within channels 212.

While embodiments of the present disclosure can utilize most metals as the material of construction, metals comprising Ni, Cu, stainless steel alloys, Ti, Ti alloys, super alloys such as Inconel, Hastelloy and Haynes alloys, and combinations thereof can be utilized. Ceramics may also be useful.

The dividing member 216 between the sets of channels can have a flat, concave, or convex contour. The dividing member can be any thickness necessary to support the channel structure and to provide a heat conduction path. In accordance with example implementations, the dividing member may have a thickness between 0.1 and 3.2 mm. The dividing member can be an impermeable solid.

Heights of the individual channels within each set can be less than 100 microns (0.1 millimeters) or greater than 1 centimeter. However, in embodiments where a solid catalyst is used, the channel heights are preferably greater than 1 mm, and still more preferably greater than 5 mm, in order to provide sufficient catalyst material to support reactions.

Referring next to FIG. 8, a schematic is depicted for providing reactants and receiving products from reactors of the present disclosure. Accordingly, a process is provided for distributing energy across a reactor such as the reactors herein.

In particular embodiments and with reference to FIG. 7A, a feed gas mixture of methane and steam enters reactor 200 at inlet 202 at the hub and are distributed into a set of identical channels 212 with non-linear side walls. The channels traverse approximately one reactor radius and can changes its direction by 90 or more degrees from start to finish. In each of the channels, a catalyst is present. This catalyst media may take the form of a foam, conforming to the channel shape, but may also include a substrate maintained in the channel such as particles. Each reaction channel can bifurcate at a short distance from the center so that the catalyst media inserts are sufficiently broad near the hub.

Near the reactor rim where the channels end, slot shaped openings connect the channels to a second set of channels that curve in the opposite direction of that of the first set of channels. The second set of channels 214 may be referred to as heat recuperation channels while the first set of channels can be referred to as reaction channels. The reaction channels and the heat recuperation channels are separated by a solid intermediate member 216 that allows heat transfer by conduction. The slot-shaped openings 230 penetrate the intermediate member to allow the reaction product streams from the reaction channels to enter the heat recuperation channels. The product streams are returned to the center through the heat recuperation channels and flow out of the reactor through the annular space 204 between the inlet and the outlet connection tubes. Similar to the reaction channels, the heat recuperation channels may also be bifurcated.

Figure 5A:
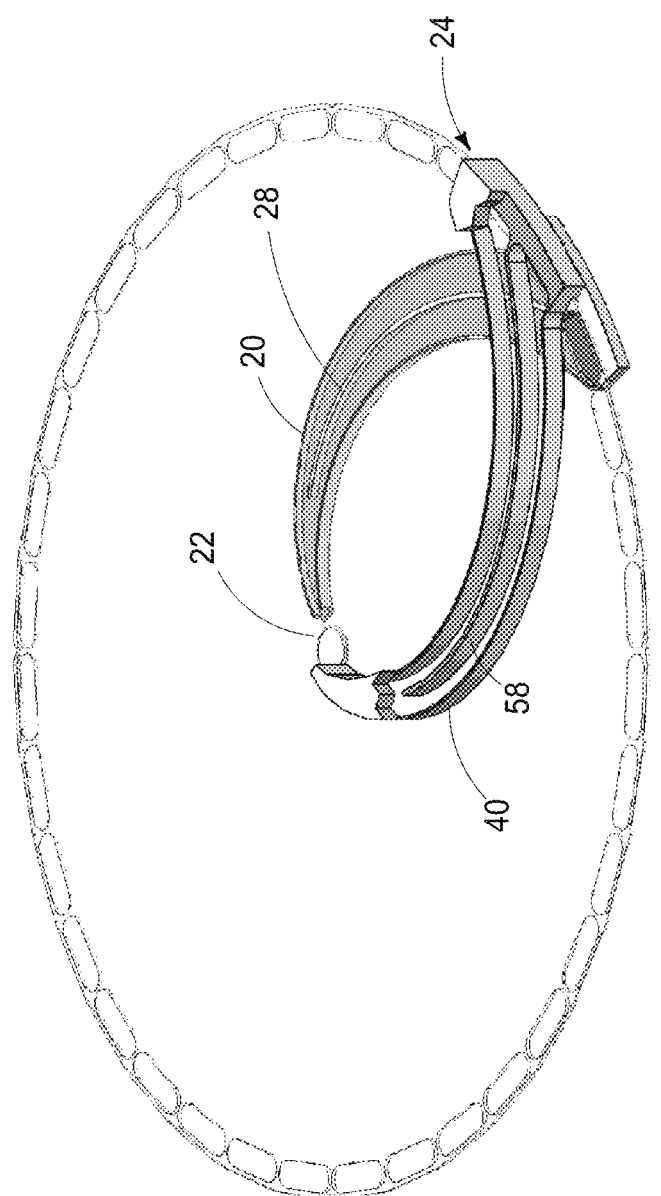
FIGS. 5A-5D are portions of a configuration and an entire configuration of a reactor assembly according to an embodiment of the disclosure.
Figure 5B:
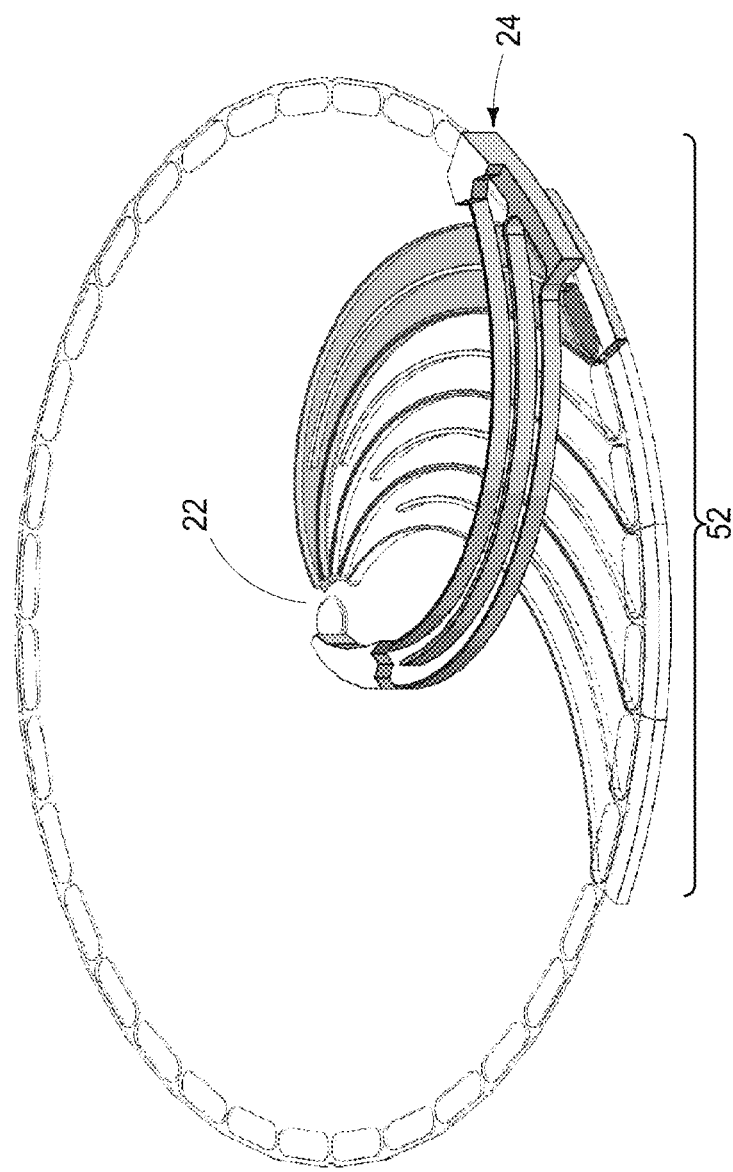
Figure 5C:
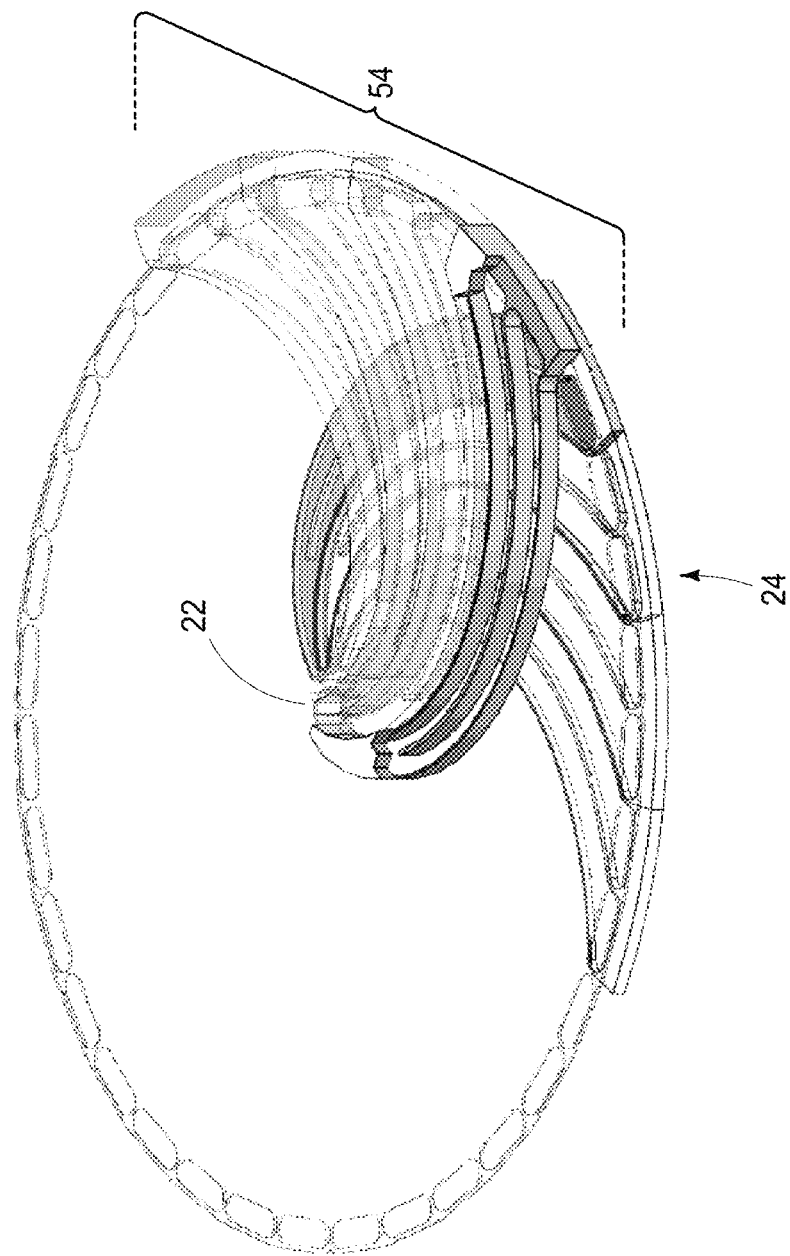
Figure 5D:
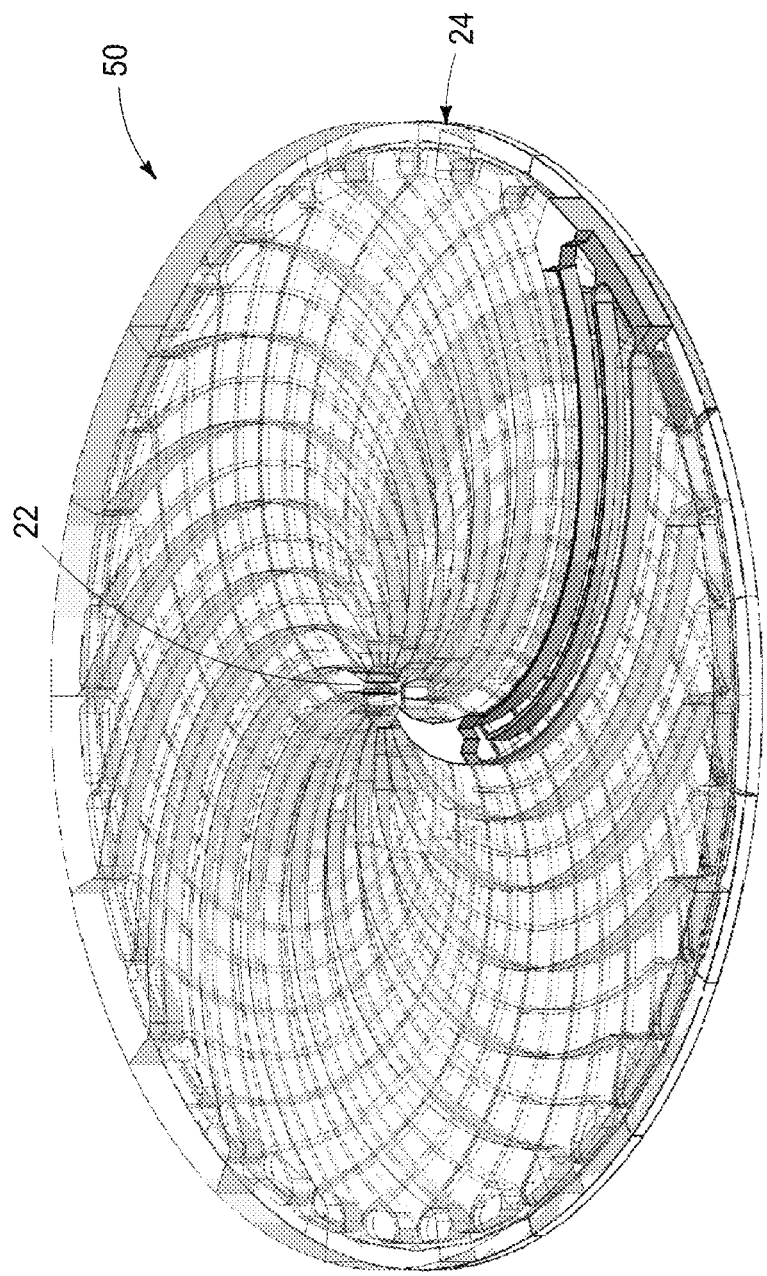

The spiral counter-cross flow pattern of this reactor is clearly shown in FIGS. 5D and 7A, where a 3-dimensional model of the reactor is rendered in wireframe style. The reactor structure can be described alternatively by a sequence of repeating a single flow path in a circular pattern, as illustrated in FIGS. 4-5D in isometric views:

1. Start with one spiral heat recuperation channel, i.e. half of a flow path.
2. Add one reaction channel of opposite spiral direction.
3. Connect the reaction channel and the heat recuperation channel by a slot opening between them near the reactor perimeter. The reaction channel is shown without catalyst and with part of its top wall removed for clarity.
4. Repeat the heat recuperation channel in a circular pattern.
5. Repeat the reaction recuperation channel in a circulation pattern.
6. Complete the patterns to a full circle, producing one group of spiral reaction channels and one group of heat recuperation channel in opposite spirals, arranged in counter flow.

Reactive flow under steam methane reforming conditions and non-uniform solar flux distribution of embodiments of the present reactor assembly and methods can be simulated to understand the effects of reactor geometry and channel configuration on temperature and thermomechanical stress distributions.

In one embodiment, the reactor provides thermal spreading over a large reactor area and multiple channels. The non-linear revolution can be one quarter or more of a full circle. In one embodiment incorporating counter-cross flow, the two sets of channels can cover a substantial area of the reactor, thus using the fluid to provide substantial thermal spreading from hot zones to colder zones.

Figure 7B:
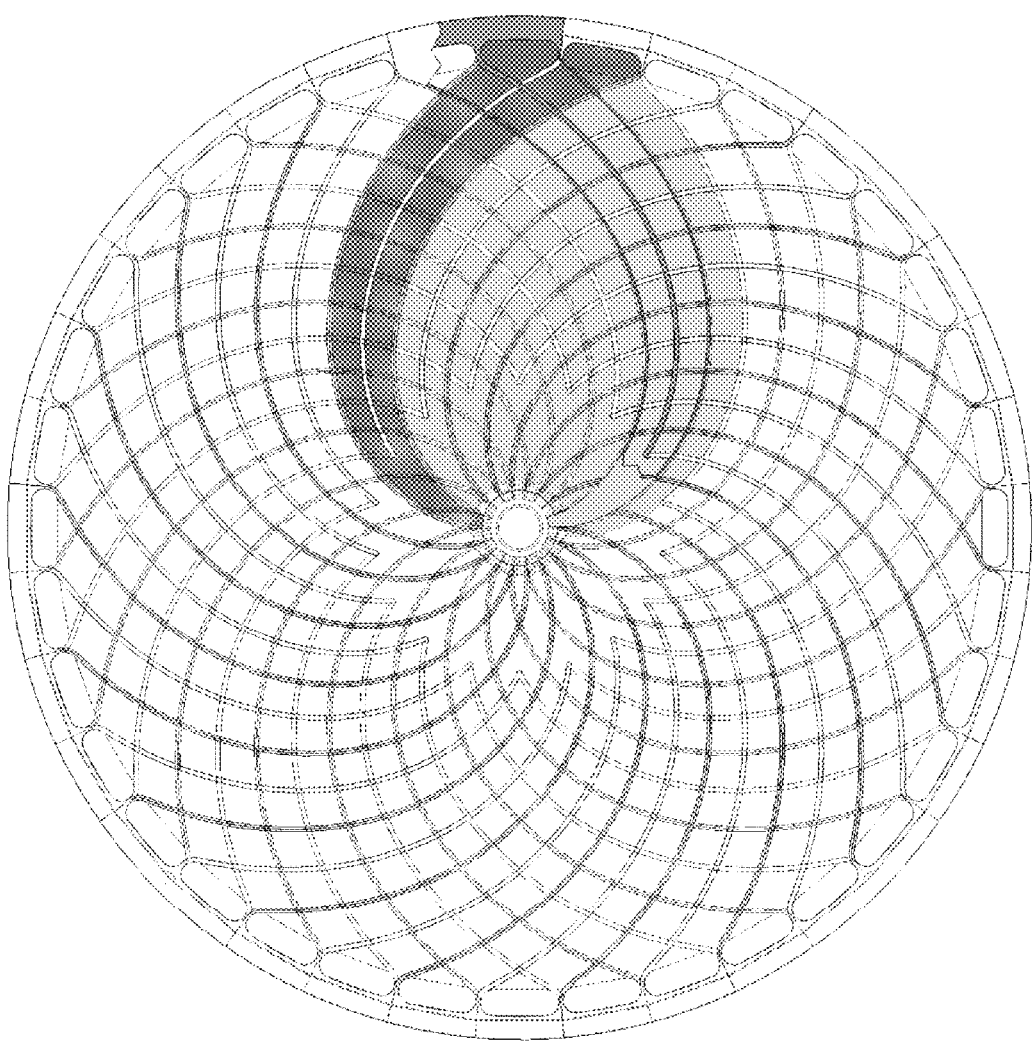
FIG. 7B is a depiction of a reactor shown with one fluid channel in a first set of fluid channels in thermal contact with a plurality of fluid channels in a second set of fluid channels.

Each feed stream flowing in channels 212 is in thermal contact through dividing member 216 with a plurality of product streams in the counter flow channels 214, the flow path of the latter group of streams cover approximately one-fifth of the entire area between the two sets of flow channels. Referring to FIG. 7B, the red area is occupied by feed stream in one channel. The yellow area is the portion of the flow paths of all product streams flowing cross the said feed stream. Thus the yellow area represents the extent of heat spreading afforded to each single channel. This area is 18% of the entire area between hub and rim.

The counter-cross flow arrangement of reaction channels and recuperative channels can provide efficient thermal spreading of inhomogeneous solar irradiation to a substantially greater degree than could be provided by direct thermal conduction through metal layers. The reduction of hot spots leads to lower operating and capital costs through improvements to reactor's operability under high flux conditions and longer reactor life by reducing thermal stress, respectively.

Figure 9:
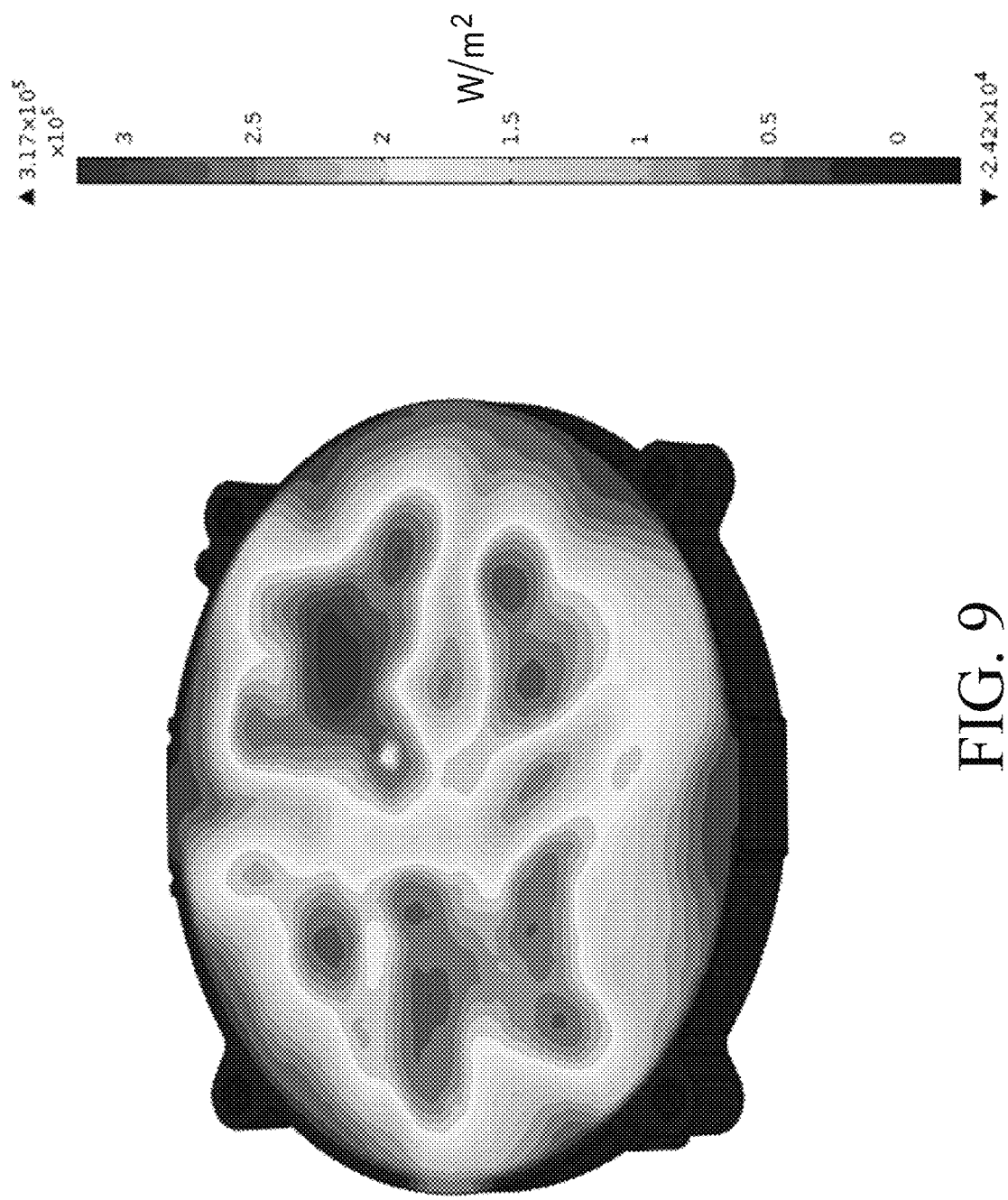
FIG. 9 is a depiction of thermal flux distribution data according to an embodiment of the disclosure.
Figure 10A:
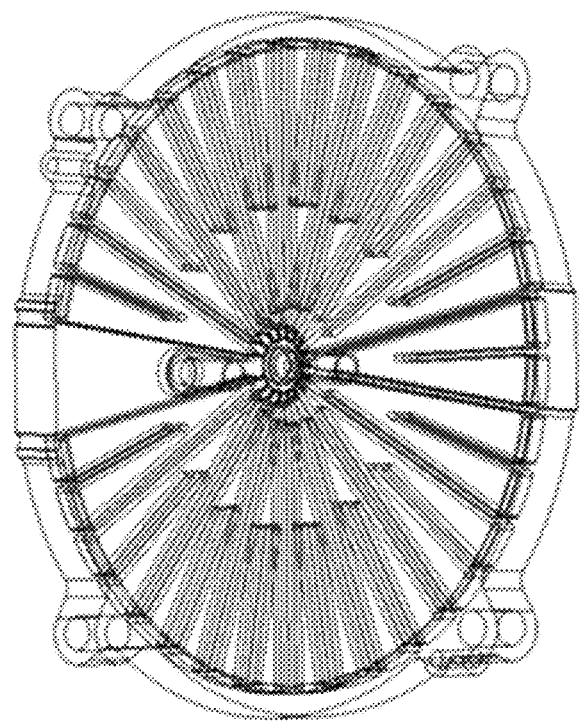
FIGS. 10A-10C are depictions of thermal and stress distribution data according to embodiments of the disclosure.

The solar flux distribution on the reactor surface can be estimated from a moon flux distribution obtained in previous experiments through a mapping exercise where the parabolic dish was pointed at a full moon. The results are shown in FIG. 9 in $W/m^2$ where multiple hot spots are clearly present. This flux distribution was specified as a boundary condition on the reactor front face for simulation models. Reactors having non-linear channels of the present disclosure and a previous design of radial counter flow linear channels with otherwise similar reactor and channel dimensions were simulated for comparison. The linear reactor and the non-linear reactor models are shown in FIGS. 10A-10C, and 11A-11C respectively.

Figure 11A:
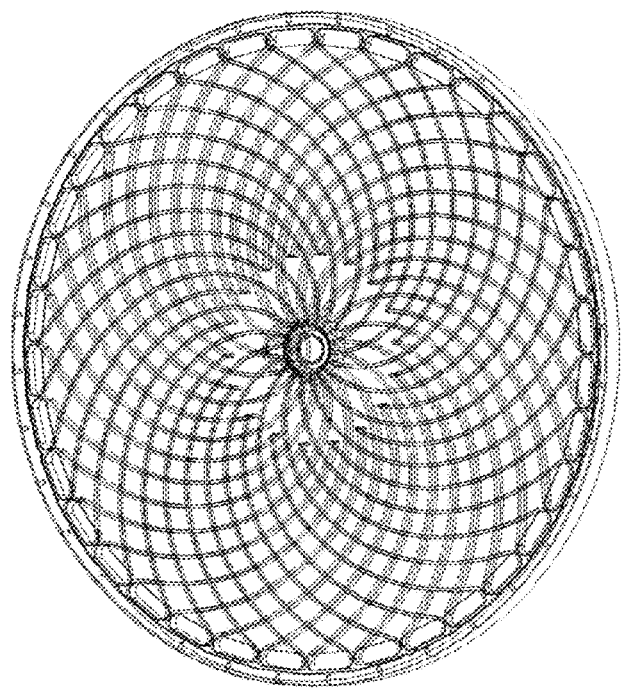
FIGS. 11A-11C are depictions of thermal and stress distribution data according to an embodiment of the disclosure.
Figure 11B:
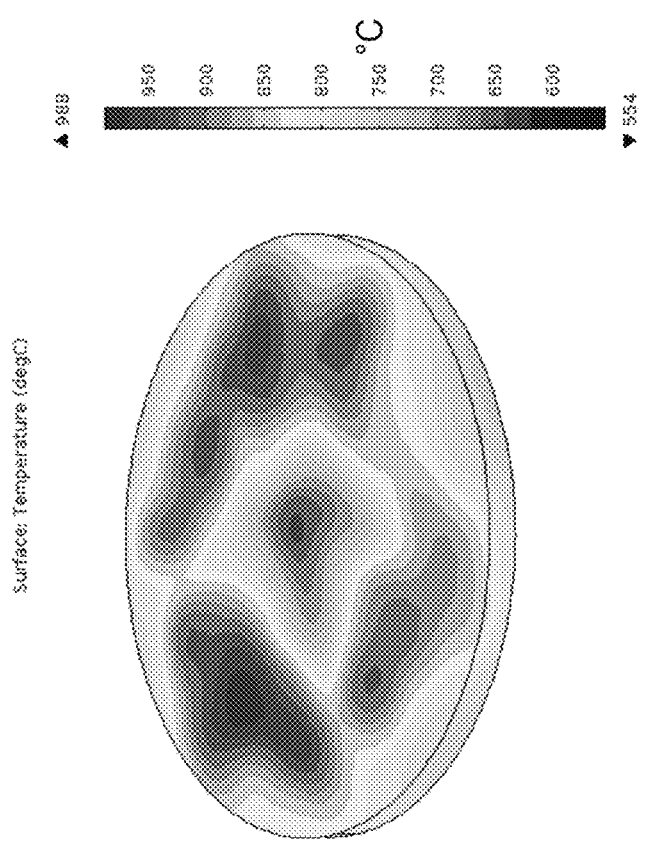
Figure 10B:
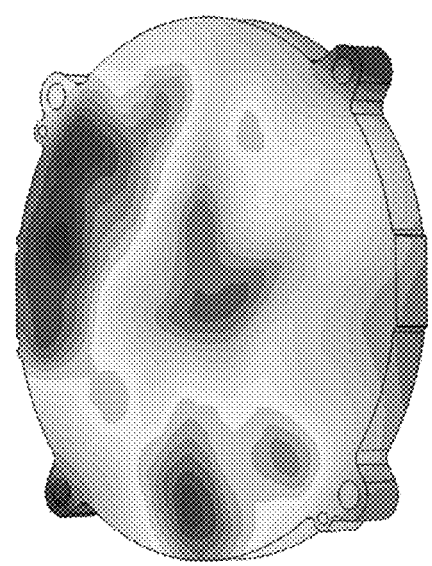

The reactor surface temperature distributions under a set of typical high solar flux conditions (9.6 kW total incident solar power, >80% methane conversion, 0.032 mol/s methane flow, steam to carbon ratio of 3) are shown in FIGS. 10B and 11B, respectively, for the linear reactor and the non-linear reactors. The maximum surface temperature was found to be 988° C. in the case of the non-linear, spiral counter-cross-flow reactor, over 100° C. reduction from the maximum surface temperature of 1114° C. in the case of the linear reactor. Visually, the hot regions on the surface of the non-linear reactor are spread out more evenly than on the linear reactor. The superior thermal spreading by the non-linear reactor is attributed to the crossing of any reaction channels under a hot spot by multiple recuperation channels downstream of the hot spot with the greater amount of received heat then being spread to other channels rather than back to the same channel. Conceptually, the thermal spreading in the linear reactor can be limited to the area of one wedge shaped reaction channel, or about 5% of total surface area. The thermal spreading in the non-linear reactor is over at least an area enclosed by a reaction channel and its connected heat recuperation channel, or up to about 18% of total surface area.

Figure 11C:
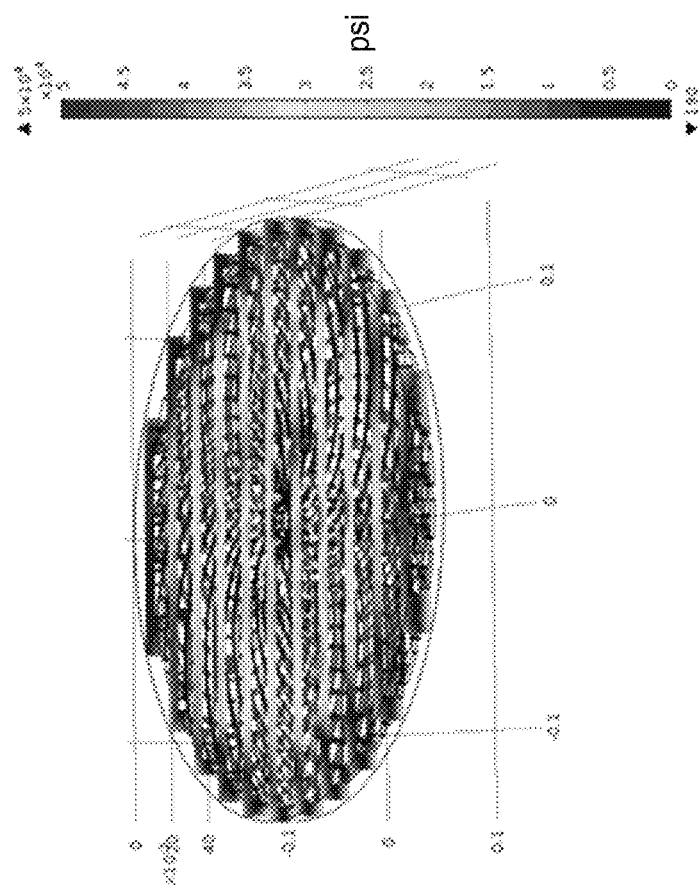
Figure 10C:
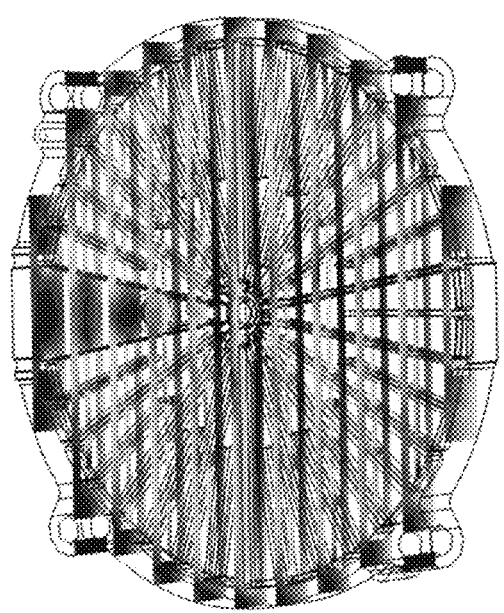

The von Mises stress in psi units is given in FIGS. 10C and 11C, for the linear reactor and the non-linear reactor, respectively. The non-linear reactor has lower maximum stress than the linear reactor. The difference may be attributed to thermal spreading and the resulting lower thermomechanical stress.

One embodiment of the present disclosure was tested in a solar thermochemical reaction system that consisted of a solar concentrator of the parabolic dish type, an on-sun reactor unit located at the focal point of the dish, and the balance of plant located on the ground. The configuration of the reaction system is given in FIG. 8. The on-sun reactor unit included a steam methane reforming reactor, recuperative heat exchangers, water vaporizer, and onboard process controllers. Feed gas system, water pump, process analytical equipment, and tail gas flare were on the ground. The feed gas was controlled using a mass flow controller. A methane stream was preheated by the network of recuperative heat exchangers using the product stream. Concentrated solar energy was absorbed by the reforming reactor to convert methane to syngas catalytically. The syngas product stream was cooled by the feed gas stream and additional air cooling. The compositions of the product gas were analyzed by a process gas chromatograph. The product stream was vented through a flare after condensed water was separated.

A non-linear reactor, designated TRL 6, was manufactured according the design described in previous sections. In this particular embodiment of the disclosure, the reactor was fabricated by machining individual plates and diffusion bonding the stack of the plates. The reactor was tested under medium to high solar flux conditions with pairing to an Infinia PowerDish III parabolic dish concentrator with nominal mirror area of 14.85 $m^2$. A linear reactor of otherwise similar reactor and channel dimensions, designated TRL 5, was also fabricated and tested on-sun with a dish concentrator of the same specifications.

Figure 12:
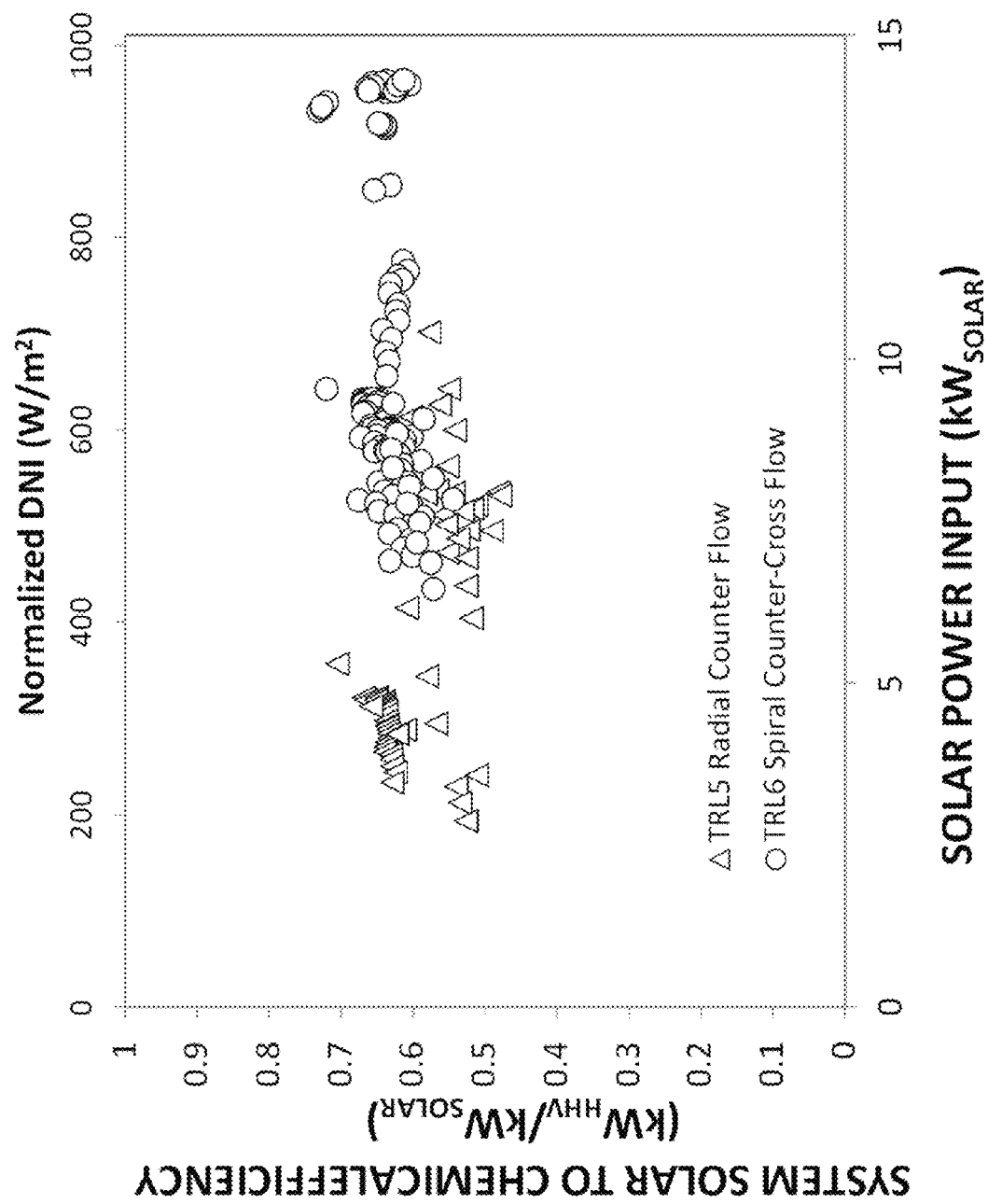
FIG. 12 is reaction data according to an embodiment of the disclosure.
Figure 13:
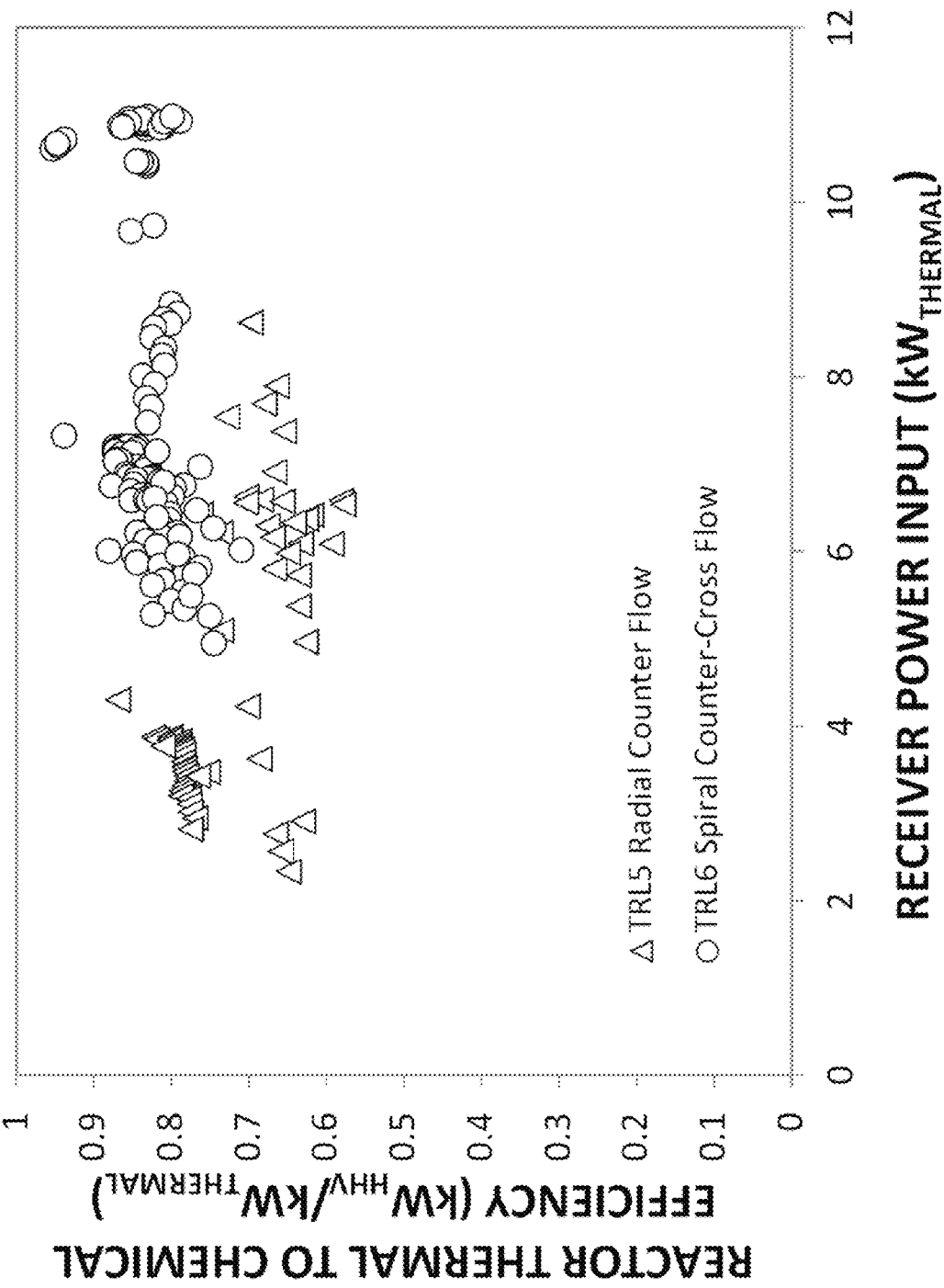
FIG. 13 is reaction data according to an embodiment of the disclosure.

With reference to FIGS. 12 and 13, the reactor performance was evaluated by the energy conversion efficiency both at the reaction system level, i.e. the reactor and its heat exchanger network plus the dish concentrator, and at the reactor component level, i.e. just the reactor itself. The system solar-to-chemical energy efficiency is defined as the ratio of the higher heating value difference between the reactor product stream and the feed stream to the direct-normal solar energy incident (DNI) upon the dish concentrator reflector and therefore includes effects due to mirror reflectivity, receiver intercept, heat losses around the reactor-receiver, and approach to equilibrium chemical conversion in the reactor. The system solar-to-chemical energy efficiency data from the on-sun testing are given in FIG. 12.

System solar-to-chemical energy efficiency as high as upper 60% to 70% was achieved with the TRL 6 reactor system. This reactor system was able to consistently achieve the high efficiency over medium to very high flux conditions. The excellent thermal spreading capacity of the non-linear reactor design allowed the reaction channels to be at higher temperatures when the reactors were operated with the same surface temperature limit. The higher thermodynamic efficiency of the endothermic reaction at higher temperature is thought to be able to make up any additional radiative heat lost, thus the overall high solar-to-chemical conversion efficiency of TRL 6 reactor was able to extend to the high flux region.

As a comparison, due to the absence of enhanced thermal spreading, the TRL 5 reactor system was not operated at the same high solar flux as the non-linear reactor system due to the surface temperature exceeding design points. In low to medium solar flux range, the non-linear reactor system also outperformed the linear reactor in terms of solar-to-chemical energy efficiency.

The performance advantage of the non-linear reactor is even more evident when the energy efficiency of the reactor is examined. The reactor thermal-to-chemical efficiency is defined as the ratio of the higher heating value difference between the reactor product stream and the feed stream to the amount of concentrated solar thermal energy received by the reactor and therefor includes effects due to heat losses around the reactor-receiver and the degree of chemical conversion in the reactor. The reactor thermal-to-chemical efficiency data from the on-sun testing are given in FIG. 13.

The TRL 5 reactor achieved 60%-70% thermal-to-chemical energy efficiency but was limited to low to medium flux operation due to the hot spot issues and reactor material temperature limit. With the TRL 6 reactor, thermal-to-chemical energy conversion efficiency as high as 85% was achieved in the high flux region. Some data points suggest even close to 90% level performance may be possible. The non-linear reactor's superior performance in energy efficiency is attributed to its ability of greater thermal spreading.

An exergy analysis was conducted based on TRL 6 reactor on-sun performance data. The objective was to evaluate the reactor and the heat exchanger's second law efficiencies and to identify the sources and magnitudes of exergy destruction. In the exergy analysis, the exergy destruction at the reactor front surface was estimated by approximating the surface temperature with an average value based on IR thermography measurements. The reference environment was chosen as 25° C. and 1 atm with chemical compositions as proposed by Szargut et al. The TRL 6 reactor's exergetic efficiency was determined to be greater than 90%. For example, when tested under conditions of 0.048 mol/s methane feed flow rate, steam to carbon ratio of 2.2, 10.88 kW concentrated solar power input, and an average reactor surface temperature of 820° C., the reactor rate of exergy destruction was estimated to be 5.34 kW, giving a reactor exergetic efficiency of 90.2%.

The invention claimed is:

1. A reactor comprising:
a first set of fluid channels;
a second set of fluid channels oriented in thermal contact with the first set of fluid channels;
wherein individual channels of the first set of fluid channels are in fluid communication with individual channels of the second set of fluid channels at a rim of the reactor; and
wherein the channels of either one of the first or second set of fluid channels are non-linear.

2. The reactor of claim 1 wherein the first set of channels define microchannels.

3. The reactor of claim 1 wherein the first set of channels define mesochannels.

4. The reactor of claim 1 wherein the first and second set of channels define microchannels.

5. The reactor of claim 1 wherein the first and second set of channels define mesochannels.

6. The reactor of claim 1 wherein both the first and second sets of fluid channels are non-linear.

7. The reactor of claim 1 further comprising a member separating the first set of fluid channels from the second set of fluid channels.

8. The reactor of claim 7 wherein the member is thermally conductive.

9. The reactor of claim 7 wherein the member defines a floor of one of the sets of fluid channels and a ceiling of the other of the sets of fluid channels, in at least one cross section.

10. A reactor comprising:
a first set of fluid channels;
a second set of fluid channels oriented in thermal contact with the first set of fluid channels; and
wherein the channels of either one of the first or second set of fluid channels are non-linear; and wherein individual channels of either the first or second set of channels includes a dividing member.

11. The reactor of claim 10 wherein the dividing member extends to form a pair of fluid passageways.

12. The reactor of claim 11 wherein individual channels of both the first and second sets of channels include a dividing member.

13. The reactor of claim 10 wherein the dividing member is an impermeable solid.

14. A reactor of comprising:
a first set of fluid channels;
a second set of fluid channels oriented in thermal contact with the first set of fluid channels;
wherein the channels of either one of the first or second set of fluid channels are non-linear; and
wherein the other of the first or second set of fluid channels is linear.

15. The reactor of claim 14 wherein the first set of channels define microchannels.

16. The reactor of claim 14 wherein the first set of channels define mesochannels.

17. A reactor comprising:
a first set of fluid channels;
a second set of fluid channels oriented in thermal contact with the first set of fluid channels;
wherein the channels of either one of the first or second set of fluid channels are non-linear; and
wherein the first set of fluid channels and the second set of fluid channels are configured such that a fluid reactant can traverse the first set of fluid channels and pass through a fluid passageway to the second set of fluid channels where the fluid can then traverse the second set of fluid channels and then exit the reactor.

18. The reactor of claim 17 wherein the first set of channels define microchannels.

19. The reactor of claim 17 wherein the first set of channels define mesochannels.

* * * * *